March 18, 1941.　　　G. T. JOHNSON ET AL　　　2,235,214
RAILWAY CAR TRUCK
Filed Feb. 4, 1939　　　6 Sheets-Sheet 1

Inventors
G. T. Johnson,
J. G. Bower,
H. W. Stertzbach,

By Seymour, Bright & Nottingham
Attorneys

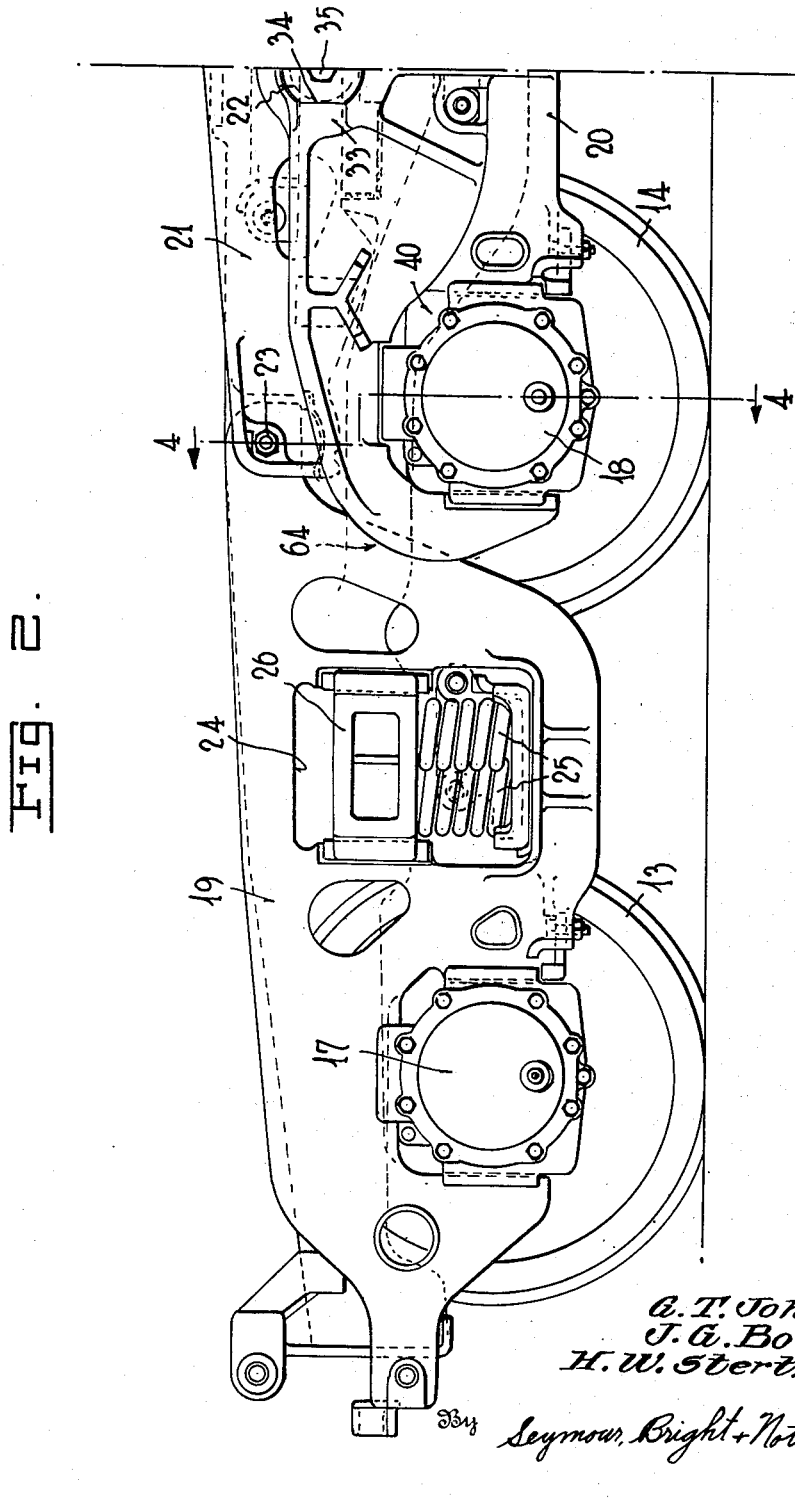

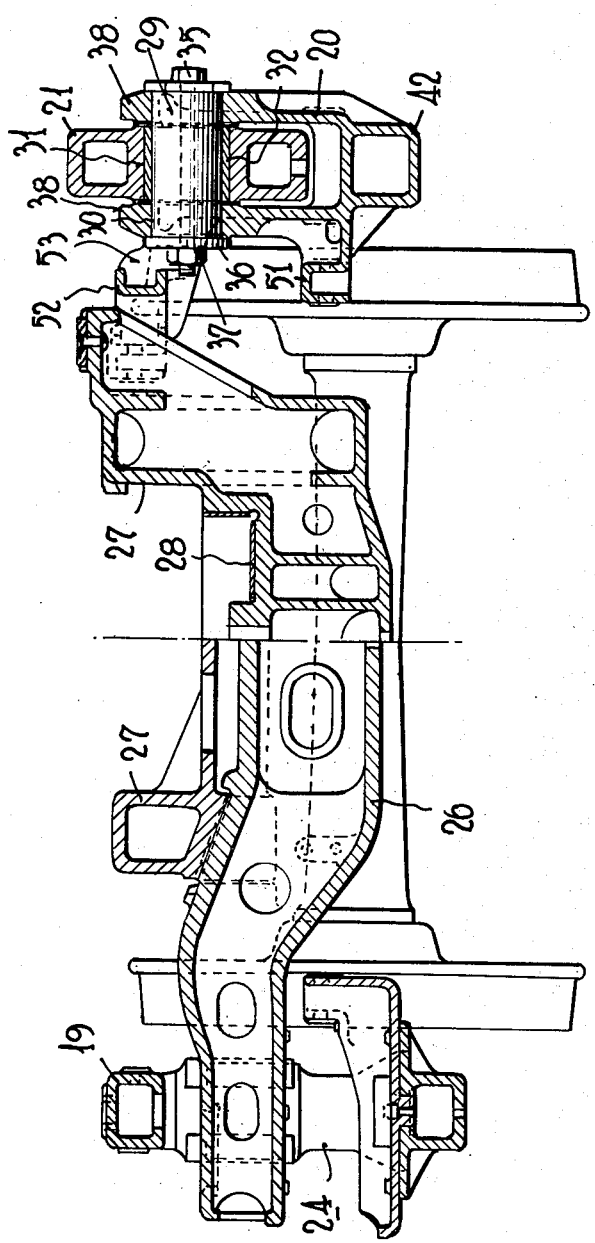

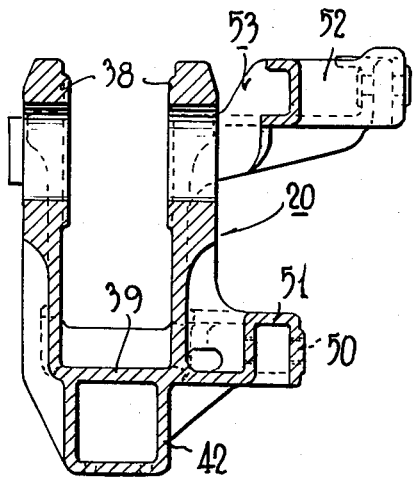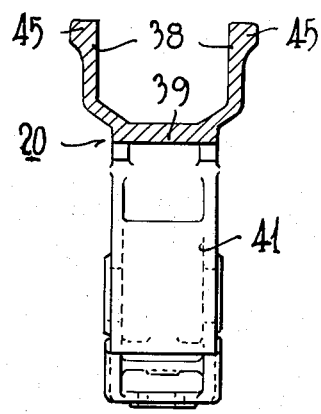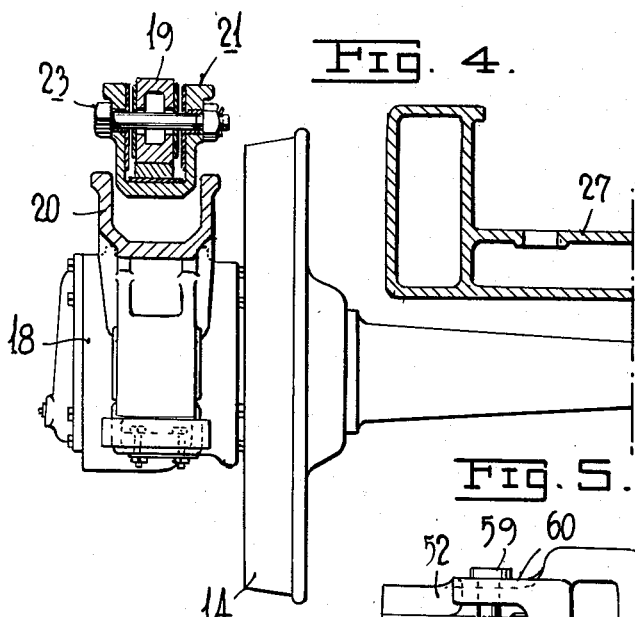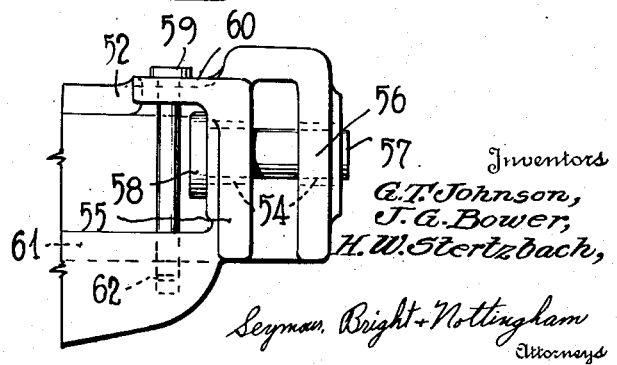

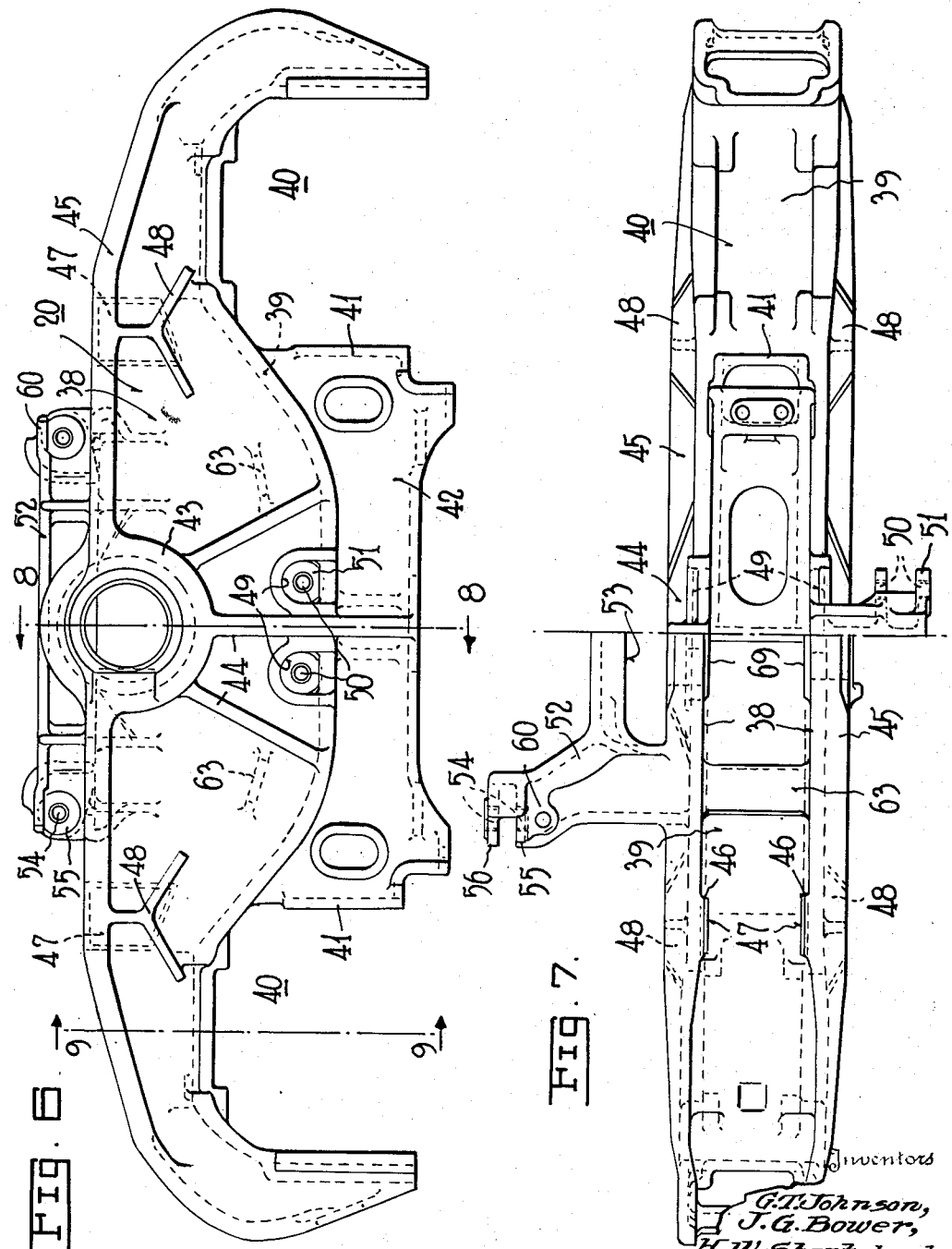

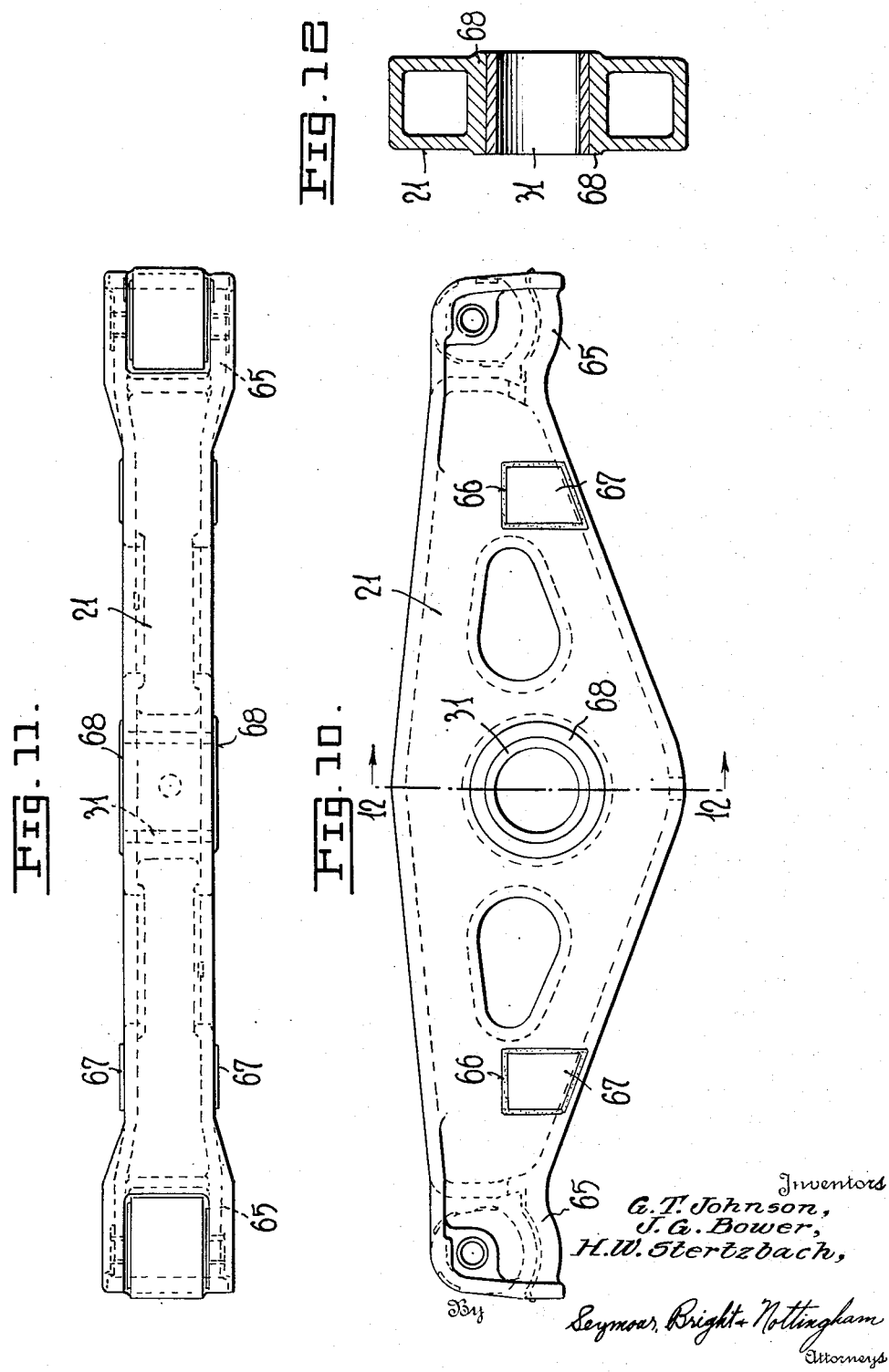

Patented Mar. 18, 1941

2,235,214

UNITED STATES PATENT OFFICE 2,235,214

RAILWAY CAR TRUCK

George T. Johnson, Columbus, Ohio, Jerome G. Bower, New York, N. Y., and Harry W. Stertzbach, Columbus, Ohio, assignors to The Buckeye Steel Castings Company, Columbus, Ohio Application February 4, 1939, Serial No. 254,710

16 Claims. (Cl. 105—183)

This invention relates to improvements in eight-wheel car trucks or the like. In such trucks, it is advantageous to distribute the load of present day railway vehicles running at high speeds, over a greater number of wheels, in order that high ma'ntenance costs due to rapid deterioration of the wheels may be materially reduced.

When the number of axles and wheels per truck is increased, it is highly desirable to provide effective means of equalizing the loads on the wheels. Sluggish and improper equalization of the load on the truck to the wheels, due to track irregularities, cross-overs, etc., causes high maximum wheel loads and defeats the purpose of increasing the number of wheels per truck. With the foregoing in mind, our improved construction has been conceived and designed with the following objects in view.

(1) To increase the number of wheels per truck or vehicle, thereby reducing the load per wheel and its resultant damage to wheels at high speed service.

(2) To provide an effectively equalized eight-wheel truck so that the equalizing system quickly responds to track irregularities and the wheels carry only their proper proportion of the truck load.

(3) To provide an eight-wheel truck in which the bolster system is maintained in a plane parallel to the vehicle body regardless of the track conditions or differences in wheel diameters.

(4) To provide an eight-wheel truck having sufficient transverse flexibility to negotiate curves, thereby reducing wheel flange pressures and lateral forces on journals as compared with rigid frame trucks.

(5) To furnish a truck having flexibility in both the vertical and transverse planes, which permits the advantages mentioned above in conforming to irregular track conditions and curves.

(6) To supply an eight-wheel truck having improved means for supporting portions of the braking system.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings:

Fig. 2 is a side elevation of one-half of the structure shown in Fig. 1, it being understood that the opposite half is identical thereto, with one exception, and that resides in an abutment surface on the intermediate side frame member of the truck to prevent turning of a pin.

Fig. 3 is a transverse vertical sectional view taken on line 3—3 of Fig. 1.

Fig. 4 is a transverse vertical sectional view of a detail taken on the line 4—4 of Fig. 2, the intermediate axle and bearing being omitted from this view.

Fig. 5 is a transverse sectional view of a detail on the line 5—5 of Fig. 1, and illustrating the manner in which a brake hanger suspension pin is retained in position.

Fig. 6 is an enlarged side elevation of one of the intermediate side frame members.

Fig. 7 is a plan view of said member, the left-hand portion of the view being taken from the top and the right-hand portion being taken from the bottom.

Figure 1:
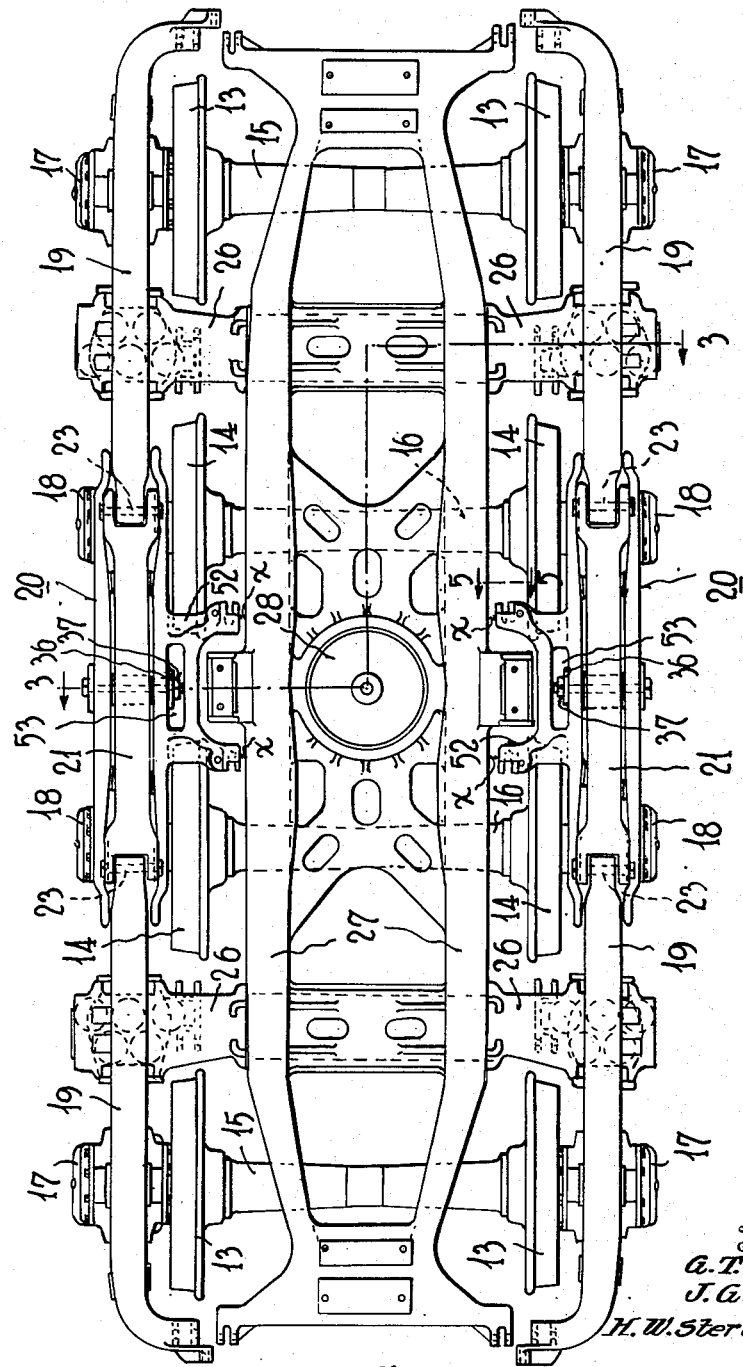
Fig. 1 is a top plan view of an embodiment of our truck with certain parts omitted to facilitate illustration.

Figs. 8 and 9 are transverse sectional views taken respectively on the lines 8—8 and 9—9 of Fig. 6.

Fig. 10 is a side elevation of one of the equalizer members of the truck.

Fig. 11 is a top plan view of the same.

Fig. 12 is a vertical transverse sectional view of such equalizer member taken on the line 12—12 of Fig. 10.

Referring to the drawings, 13 designates the end wheels and 14 the intermediate wheels of an eight-wheel truck; the end wheels being connected by axles 15 and the intermediate wheels being connected by axles 16.

The extremities of the end axles are journalled in boxes 17 and the extremities of the intermediate axles are journalled in boxes 18.

The boxes 17 partially support end members 19 of the side frame system and the boxes 18 support intermediate members 20 of such system. Rockable equalizer members 21 of the side frame system are pivotally supported at 22 by the intermediate members, and the ends of the equalizer members are movably connected at 23 to the inner ends of the members 19 so as to partially support the latter.

The members 19 have bolster openings 24 in which are arranged springs 25 which resiliently support the ends of transverse bolsters 26; the latter supporting a center bolster 27.

Having now described the main features of the invention, we will proceed with a description of novel details thereof. Referring to Figs. 1 and 2, if eight units of vertical load are carried at the center plate 28 of the main or center bolster, two units are carried at each end of the transverse bolsters 26, one unit is carried by each end wheel 13, and one unit by each equalizer member 21 at each connection 23 with each of the end frame members 19. Two units of load are then carried through each of the equalizer connections 22 into the intermediate frames 20, imparting one unit of load to each intermediate wheel 14.

The load is transmitted from each equalizer 21 to an intermediate frame member 20 by means of an equalizer pin 29 (Fig. 2 and Fig. 3) which fits into aligned circular openings 30 and 31 provided at the longitudinal centers of the associated intermediate member and equalizer. The opening of the equalizer member accommodates a bushing 32 made of bronze or any other suitable material, and the equalizer member is free to turn about the pin 29 during equalization operations. The fit of the equalizer pin in the intermediate member is a tight one and there is no relative motion between these parts. Rotation of the equalizer pin is further prevented by a lug 33 (Fig. 2) on the intermediate member which engages a straight edge 34 forming part of the end of the equalizer pin. The pin has a hole therethrough for the accommodation of a bolt 35 which also extends through a washer 36 and is secured in place by a nut 37. The pin, bolt and washer form a tie between the upstanding side walls 38 of the intermediate member, thereby reducing the laterally unsupported length of these members. The pin, bolt and washer also serve to distribute a transverse load from the equalizer member to both side walls of the intermediate member.

Referring now to Figs. 6 and 7, each intermediate frame member 20 preferably consists of a metal casting and comprises a bottom tension portion 39 and upstanding side walls 38, the top being open to receive the equalizer 21. The side walls and bottom portion 39 are extended at each end of the intermediate member to form the top and outer vertical faces or columns of a pedestal opening 40, for the reception of the intermediate journal boxes 18. The inner columns 41 which partially define said openings are formed below the bottom portion 39 and are supported longitudinally against forces due to track irregularities, braking, etc., by a box shaped section or portion 42 of the member 20, which section is continuous between the columns 41. Bosses 43 are provided around the equalizer pin hole to reduce the bearing pressure between the pin and the frame. Ribs 44 at the exterior of the member 20 and which extend substantially radially from the axis of the bosses, integrally connect each boss with a side wall of the casting 20 and serve to support and distribute the load into the casting. External flanges 45 are provided along the upper edge portions of the side walls 38 in order to stiffen portions against transverse buckling. The shape of the flanges provide gradual change in metal thickness which is essential to good foundry practice. Pads 46 are arranged on the inner surface of each side wall 38, and they are provided with wear plates 47 adapted to cooperate with similar pads and wear plates on the equalizer member (hereinafter described), and serve to keep the equalizer and intermediate member in proper alignment.

Inverted Y shaped ribs 48 are provided on the exterior of the side walls opposite the pads 46 to stiffen the side walls against any transverse force which might be transmitted to the intermediate member 20 from the equalizer at these points. Aligned openings 49 are arranged in each side wall adjacent to the bottom portion 39 and they are aligned with pin holes 50 in a brake hanger 51 integral with the member 20. This construction permits the brake hanger pins (not shown) to be applied or removed from the outer side of the truck.

A dead lever fulcrum bracket 52, used with the braking system (not shown) is integral with each intermediate member 20 and is provided with an opening 53 to permit access to the nut 37 of the bolt which extends through the retaining pin 29 (Fig. 1).

Due to the small clearance at X (Fig. 1) between the brake hanger brackets 52 and the center bolster side rails 27, it has been necessary to devise a special means of suspending the dead levers of the braking system. This is best illustrated in Fig. 5. In that figure, it will be noted that the outer end of the bracket 52 is provided with aligned openings 54 provided in opposite walls 55 and 56 of the dead lever fulcrum bracket. Owing to the small clearance $x$ (Fig. 1), the pin 57, from which the dead lever (not shown) is suspended, cannot be applied by first inserting the same through the outer wall 56 but must be introduced first through the wall 55 so that its head 58 abuts said wall. After the fulcrum pin is inserted, it is retained in position by a retaining pin 59 which passes through the top 60 and bottom 61 of the bracket. The retaining pin may be locked in position by a cotter pin (not shown) which extends through a hole 62 in the lower end portion of the pin.

The equalizer member 21 (Figs. 10 to 12 inclusive) operates between the side walls 38 of the intermediate member 20 and therefore integral ties 63, Figs. 6 and 7, connect said side walls to stiffen or strengthen them as near as possible to the bottom of the equalizer.

The open top construction of the intermediate member 20 is continued around the ends of that member in order to receive the inner ends of the end members 19 of the side frame system as indicated at 64 in Fig. 2. This over-lapping permits conseederable shortening of the wheel base, yet provides adequate clearance for vertical motion of the end members 19 during equalization.

The design of the equalizer member (Figs. 10 to 12) inclusive provides economical distribution of metal. The member is of rectangular box shape section throughout its length except at the ends 65 where provision has been made to rockably and slidably support the inner ends of the frame members 19, as indicated at 23 in Fig. 2. The construction here may be like that illustrated in Figs. 5 and 6 of the application of C. L. Orr, Serial No. 197,927, filed March 24, 1938. The depth of the equalizer increases uniformly toward the center and is greatest at the center where maximum bending occurs. The bushing 31 at the center of the member receives the retaining pin 29 which rockably supports the equalizer member at its longitudinal center. Pads 66 at opposite sides of the equalizer are provided with wearing plates 67 which cooperate with the wearing plates 47 of the intermediate member 20 to keep the two members in alignment, and to transmit transverse forces due to track curvature, body roll, etc., from the equalizer member into the intermediate member. Bosses 68 at opposite sides of the equalizer cooperate with similar bosses 69 on the intermediate member and serve to keep the equalizer centrally located between the upstanding walls 38 of the intermediate members.

While we have disclosed our improvements in connection with an eight-wheel car truck, it will be manifest that many of such improvements may be used in a truck with a greater or less number of wheels.

From the foregoing it is believed that the construction, operation and advantages of our improvements may be readily understood by those skilled in the railway truck art.

What we claim and desire to secure by Letters Patent is:

1. In a railway car truck, a wheel-supported intermediate side frame member having upstanding side walls and an open top, and an equalizer member of substantially the same length as said intermediate member, extending into the intermediate member through the open top of the latter and arranged partially between said upstanding side walls, a retaining pin passing through the longitudinal central portions of the intermediate member and equalizer and pivotally supporting the equalizer on the intermediate member, and wheel-supported end side frame members movably connected to the ends of the equalizer member.

2. In a railway car truck, a wheel-supported intermediate side frame member having upstanding side walls and an open top, and an equalizer member extending into the intermediate member through the open top of the latter and arranged partially between said upstanding side walls, a retaining pin passing through the longitudinal central portions of the intermediate member and equalizer and pivotally supporting the equalizer on the intermediate member, cooperating wear plates provided on the intermediate member and equalizer and arranged at opposite sides of said retaining pin, said upstanding walls having reinforcements arranged externally thereof and in register with said wear plates, and wheel-supported end side frame members movably connected to the ends of the equalizer member.

3. In a railway car truck, a wheel-supported intermediate side frame member having upstanding side walls and an open top, and an equalizer member extending into the intermediate member through the open top of the latter and arranged partially between said upstanding side walls, a retaining pin passing through the longitudinal central portions of the intermediate member and equalizer and pivotally supporting the equalizer on the intermediate member, said retaining pin being fixed to the intermediate member to prevent turning of the pin, and wheel-supported end side frame members movably connected to the ends of the equalizer member.

4. In a railway car truck, a wheel-supported intermediate member having upstanding side walls and an open top, and an equalizer member extending into the intermediate member through the open top of the latter and arranged partially between said upstanding side walls, and a retaining pin passing through the longitudinal central portions of the intermediate member and equalizer and pivotally supporting the equalizer on the intermediate member, said intermediate member consisting of a metal casting provided with inner pedestal columns and having a box section extending continuously between said columns and below said upstanding walls.

5. In a railway car truck, a wheel-supported intermediate side frame member having upstanding side walls, an open top and a bottom, and an equalizer member extending into the intermediate member through the open top of the latter and arranged partially between said upstanding side walls, a retaining pin passing through the longitudinal central portions of the intermediate member and equalizer and pivotally supporting the equalizer on the intermediate member, and ties joining said walls immediately below the equalizer and at opposite sides of the longitudinal center of the intermediate member, said ties being spaced from and positioned above the bottom of the side frame member.

6. In a railway car truck, a wheel-supported intermediate side frame member having upstanding side walls and an open top, and an equalizer member of substantially the same length as said intermediate member, extending into the intermediate member through the open top of the latter and arranged partially between said upstanding side walls, a retaining pin passing through the longitudinal central portions of the intermediate member and equalizer and pivotally supporting the equalizer on the intermediate member, said equalizer gradually decreasing in depth from its longitudinal center to the outer end portions thereof, and wheel-supported end side frame members having their inner ends movably connected to the ends of the equalizer member.

7. In a railway car truck, a wheel-supported intermediate member having upstanding side walls and an open top, and an equalizer member extending into the intermediate member through the open top of the latter and arranged partially between said upstanding side walls, and a retaining pin passing through the longitudinal central portions of the intermediate member and equalizer and pivotally supporting the equalizer on the intermediate member, opposite sides of the equalizer and said walls being provided with cooperating bosses surrounding the retaining pin, each of said side walls being provided with a reinforcing flange at its upper edge portion and a reinforcing boss which surrounds the retaining pin and merges into the flange.

8. In a railway car truck, a wheel-supported intermediate member having upstanding side walls and an open top, and an equalizer member extending into the intermediate member through the open top of the latter and arranged partially between said upstanding side walls, a retaining pin passing through the longitudinal central portions of the intermediate member and equalizer and pivotally supporting the equalizer on the intermediate member, a bolt extending through the retaining pin, a washer and nut arranged at the inner end of the bolt, and a dead lever fulcrum bracket on the intermediate member on the inner side wall of the intermediate member provided with an opening to permit said nut and washer to be applied or removed.

9. An intermediate member for a railway truck of the character described comprising a metal casting having a bottom web portion from which extend upstanding side walls, the top of the casting being open and the longitudinal central portions of the side walls being provided with aligned openings adapted to receive a retaining pin, said bottom portion and walls having their end portions extending downwardly to form outer column guides, the casting being of box section below the medial portion of the casting and said section forming inner column guides which merge at their upper ends into said bottom portion of the intermediate member.

10. An intermediate member for a railway truck of the character described comprising a metal casting having a bottom web portion from which extend upstanding side walls, the top of the casting being open and the longitudinal central portions of the side walls being provided with aligned openings adapted to receive a retaining pin, said bottom portion and walls having their end portions extending downwardly to form outer column guides, the casting being of box section below the medial portion of the casting and said section forming inner column guides which merge at their upper ends into said bottom portion of the intermediate member, a brake hanger bracket rigidly united with said casting, positioned at one side of said casting and provided with pin-receiving openings, and the side walls of the intermediate member having openings aligned with the openings in the bracket.

11. In a railway truck of the type having an intermediate side frame member with upstanding walls provided with aligned apertures at their longitudinal central portions and an equalizer arranged partially between said walls and having an opening aligned with the openings in the walls, the improvement which comprises a retaining pin extending through the walls and equalizer member and having a head arranged at the outer side of the intermediate member, cooperating means on the head and on one of said walls to prevent rotation of the pin relatively to the intermediate member, a washer arranged at the inner end of the pin and positioned exteriorly of the intermediate member, and a bolt extending through said pin and washer and securing the washer in position, the washer being of greater diameter than said pin.

12. In a truck of the character described, an intermediate side frame member having upstanding walls provided with aligned apertures at their longitudinal central portions, an equalizer arranged partially between said walls and having an opening aligned with the openings in the walls, a retaining pin extending through the walls and equalizer member and having a head arranged at the outer side of the intermediate member, cooperating means on the head and on one of said walls to prevent rotation of the pin relatively to the intermediate member, a washer arranged at the inner end of the pin and positioned exteriorly of the intermediate member, a bolt extending through said pin and washer and securing the washer in position, the washer being of greater diameter than said pin, and a dead lever fulcrum bracket rigidly united with the intermediate member and having an opening intermediately above said washer to permit the washer and bolt to be detached from the retaining pin.

13. In a railway car truck, wheel-supported intermediate axles having journal boxes at the ends thereof, an intermediate side frame member mounted on said boxes and having upstanding side walls and an open top, an equalizer member of substantially the same length as said intermediate member extending into the intermediate member through the open top of the latter and arranged partially between said upstanding side walls, a retaining pin passing through the longitudinal central portions of the intermediate member and equalizer member and pivotally supporting the equalizer member on the intermediate member, the end portions of the equalizer member being arranged directly above the journal boxes, and wheel-supported end side frame members having inner end portions movably connected to the end portions of the equalizer member.

14. In a railway car truck, a wheel-supported intermediate side frame member having upstanding side walls, an open top and pedestal openings at the ends thereof, an equalizer member of substantially the same length as the intermediate member extending into the latter through the open top thereof and arranged partially between said upstanding side walls, the ends of the equalizer member being arranged above said pedestal openings, a retaining pin passing through the longitudinal central portions of said members and pivotally supporting the equalizer member on the intermediate member, and wheel-supported end side frame members having inner end portions movably connected to the ends of the equalizer member.

15. An intermediate side frame member for a railway car truck comprising a metal casting having upstanding side walls, the longitudinal central portions of the side walls being provided with aligned openings adapted to receive a retaining pin, and a dead lever fulcrum bracket rigidly united with one of said walls and arranged outwardly of that wall, said bracket having a vertical opening therethrough positioned at the outer side of the last-mentioned wall and forming a means by which access may be had to a fastening device of said retaining pin.

16. An equalizer for a railway truck of the character described, comprising a metal casting provided at its longitudinal center with a pin-receiving aperture aligned with a bushing, said casting gradually decreasing in depth from its longitudinal center toward each end portion thereof, and each end portion of the casting being provided with a cradle in its upper surface and opposite apertured ears extending upwardly from the cradle to facilitate the connection of an end side frame member thereto.

GEORGE T. JOHNSON.
JEROME G. BOWER.
HARRY W. STERTZBACH.